United States Patent

Marecki et al.

(10) Patent No.: US 10,970,389 B2
(45) Date of Patent: Apr. 6, 2021

(54) RESOURCE REALLOCATION BASED ON EXPECTED REWARDS

(71) Applicant: International Business Machines Corporation, Armonk, NY (US)

(72) Inventors: Janusz Marecki, New York, NY (US); Fei Fang, Pittsburgh, PA (US); Dharmashankar Subramanian, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 15/860,278

(22) Filed: Jan. 2, 2018

(65) Prior Publication Data

US 2019/0205534 A1 Jul. 4, 2019

(51) Int. Cl.
*G06F 21/55* (2013.01)
*G06F 9/50* (2006.01)
*G06F 21/57* (2013.01)

(52) U.S. Cl.
CPC .......... *G06F 21/554* (2013.01); *G06F 9/5016* (2013.01); *G06F 21/552* (2013.01); *G06F 21/577* (2013.01); *G06F 2221/034* (2013.01)

(58) Field of Classification Search
CPC ............ G06F 17/5018; G06F 17/5036; G06F 17/5019; G06F 9/5011; G06F 9/5016; G06F 221/034; G06F 21/577; G06F 21/57; G06F 21/552; G06F 21/54; G06F 21/55; G06F 21/56; G06F 21/554
See application file for complete search history.

(56) References Cited

U.S. PATENT DOCUMENTS 7,377,431 B2    5/2008  Urken
7,757,595 B2 *  7/2010  Khosla ................ F41G 3/04
                                            89/1.11

(Continued)

OTHER PUBLICATIONS

Jain et al., "Security Games with Arbitrary Schedules: A Branch and Price Approach", AAAI'10 Proceedings of the Twenty-Fourth AAAI Conference on Artificial Intelligence, Atlanta, Georgia, Jul. 11-15, 2010, pp. 792-797.

(Continued)

*Primary Examiner* — Matthew Smithers
*Assistant Examiner* — Shaqueal D Wade
(74) *Attorney, Agent, or Firm* — Scully, Scott, Murphy & Presser, P.C.; Daniel P. Morris

(57) ABSTRACT

Methods and systems for determining a reallocation of resources are described. A device may determine initial allocation data that indicates a first amount of resources allocated to a plurality of areas. The device may determine a set of attacker expected rewards based on the initial allocation data. The device may determine a set of defender expected rewards based on the attacker expected rewards. The device may determine moving rewards indicating defensive scores in response to movement of the resources among the plurality of areas. The device may determine defender response rewards indicating defensive scores resulting from an optimal attack on the plurality of areas. The device may generate reallocation data indicating an allocation of a second amount of resources to the plurality of areas. The second amount of resources may maximize the moving rewards and the defender response rewards.

20 Claims, 6 Drawing Sheets

(56) References Cited

U.S. PATENT DOCUMENTS

| | | | |
|---|---|---|---|
| 9,418,408 B1* | 8/2016 | Thompson | G06T 5/009 |
| 2007/0087756 A1 | 4/2007 | Hoffberg | |
| 2007/0226796 A1* | 9/2007 | Gilbert | H04L 63/1425 |
| | | | 726/22 |
| 2010/0082513 A1* | 4/2010 | Liu | G06N 20/00 |
| | | | 706/46 |
| 2013/0114500 A1 | 5/2013 | Liu et al. | |
| 2013/0273514 A1 | 10/2013 | Tambe et al. | |
| 2014/0274246 A1* | 9/2014 | Tsai | A63F 13/67 |
| | | | 463/9 |
| 2015/0273341 A1* | 10/2015 | Fang | A63F 13/40 |
| | | | 463/9 |
| 2018/0349598 A1* | 12/2018 | Harel | G06F 21/577 |

OTHER PUBLICATIONS

Halvorson et al., Multi-step Multi-sensor Hider-Seeker Games, IJCAI'09 Proceedings of the 21st International jont conference on Artificial Intelligence, Pasadena, California, Jul. 11-17, 2009, pp. 159-166.

Tsai et al., "Urban Security: Game-Theoretic Resource Allocation in Network Physical Domains", AAAI'10 Proceedings of the Twenty-Fourth AAAI Conference on Artificial Intelligence, Atlanta, Georgia, Jul. 11-15, 2010, pp. 881-886.

Chen et al., "A Game Theory Approach for the Reallocation of Security Forces against Terrorist Diversionary Attacks", ISI 2009, Jun. 8-11, 2-9, Richardson, TX, pp. 89-94.

Van Long et al., "Cost Manipulation Games in Oligopoly, with Costs of Manipulating", International Economic Review, vol. 42, No. 2, May 2001, pp. 505-533.

Kiekintveld et al., "Approximation Methods for Infinite Bayesian Stackelberg Games: Modeling Distributional Payoff Uncertainty", Proceedings of the 10th International Conference on Autonomous Agents and Multiagent Systems (AAMAS 2011), May 2-6, 2011, Taipei, Taiwan.

* cited by examiner

RESOURCE REALLOCATION BASED ON EXPECTED REWARDS

FIELD

The present application relates generally to computers, and computer applications, and more particularly to resource allocation in security domains.

BACKGROUND

In security domains, resources may be allocated to mitigate effects of an attack. In some examples, potential threats may be detected, and reallocation of the resources in the security domain may be necessary.

SUMMARY

In some examples, methods for determining a reallocation of resources among a plurality of physical areas are generally described. The methods may include determining, by an allocation module of a computer device, initial allocation data that indicates a first amount of resources allocated to a plurality of areas. The methods may further include determining, by an attack module of the computer device, a set of attacker expected rewards based on the initial allocation data. Each attacker expected reward may indicate an expectation of attack scores resulting from an attack on a corresponding area, and each attacker expected reward may decrease as an amount of resources allocated to the corresponding area increases. The methods may further include determining, by a defense module of the computer device, a set of defender expected rewards based on the attacker expected rewards. Each defender expected reward may indicate an expectation of defensive scores resulting from the attack on the corresponding area, and each defender expected reward may increase as an amount of resources allocated to the corresponding area increases. The methods may further include determining, by the defense module of the computer device, a set of moving rewards indicating defensive scores in response to movement of the resources among the plurality of areas. The methods may further include determining, by the defense module of the computer device, a set of defender response rewards that indicates defensive scores resulting from an optimal attack on the plurality of areas. The methods may further include generating, by the allocation module of the computer device, reallocation data based on the set of moving rewards and the set of defender response rewards. The reallocation data may indicate an allocation of a second amount of resources to the plurality of areas, and the second amount of resources may maximize at least some of the defensive scores indicated by the set of moving rewards and the set of defender response rewards.

In some examples, systems effective to determine a reallocation of resources among a plurality of physical areas are generally described. The systems may include a memory configured to store a set of allocation instructions. The system may further a computer device configured to be in communication with the memory. The computer device may include an allocation module, an attack module configured to be in communication with the allocation module, and a defense module configured to be in communication with the allocation module and the attack module. The allocation module may be configured to determine initial allocation data that indicates a first amount of resources allocated to a plurality of areas. The allocation module may be further configured to send the initial allocation data to the attack module. The attack module may be configured to determine a set of attacker expected rewards based on the initial allocation data. Each attacker expected reward may indicate an expectation of attack scores resulting from an attack on a corresponding area, and each attacker expected reward may decrease as an amount of resources allocated to the corresponding area increases. The defense module may be configured to determine a set of defender expected rewards based on the attacker expected rewards. Each defender expected reward may indicate an expectation of defensive scores resulting from the attack on the corresponding area, and each defender expected reward may increase as an amount of resources allocated to the corresponding area increases. The defense module may be further configured to determine a set of moving rewards indicating defensive scores in response to movement of the resources among the plurality of areas. The defense module may be further configured to determine a set of defender response rewards that indicates defensive scores resulting from an optimal attack on the plurality of areas. The defense module may be further configured to send the set of moving rewards to the allocation module. The defense module may be further configured to send the set of defender response rewards to the allocation module. The allocation module may be further configured to generate reallocation data based on the set of moving rewards and the set of defender response rewards. The reallocation data may indicate an allocation of a second amount of resources to the plurality of areas, and the second amount of resources may maximize at least some of the defensive scores indicated by the set of moving rewards and the set of defender response rewards.

In some examples, computer program products for determining a reallocation of resources among a plurality of physical areas are generally described. The computer program products may include a computer readable storage medium having program instructions embodied therewith. The program instructions may be executable by a device to cause the device to determine initial allocation data that indicates a first amount of resources allocated to a plurality of areas. The program instructions may be further executable by a device to cause the device to determine a set of attacker expected rewards based on the initial allocation data. Each attacker expected reward may indicate an expectation of attack scores resulting from an attack on a corresponding area, and each attacker expected reward may decrease as an amount of resources allocated to the corresponding area increases. The program instructions may be further executable by a device to cause the device to determine a set of defender expected rewards based on the attacker expected rewards. Each defender expected reward may indicate an expectation of defensive scores resulting from the attack on the corresponding area, and each defender expected reward may increase as an amount of resources allocated to the corresponding area increases. The program instructions may be further executable by a device to cause the device to determine a set of moving rewards indicating defensive scores in response to movement of the resources among the plurality of areas. The program instructions may be further executable by a device to cause the device to determine a set of defender response rewards that indicates defensive scores resulting from an optimal attack on the plurality of areas. The program instructions may be further executable by a device to cause the device to generate reallocation data based on the set of moving rewards and the set of defender response rewards. The reallocation data may indicate an allocation of a second amount of resources to the plurality of areas, and the second amount of resources may maximize at least some of the defensive scores indicated by the set of moving rewards and the set of defender response rewards.

DETAILED DESCRIPTION

Briefly stated, methods and systems for determining a reallocation of resources are described. A device may determine initial allocation data that indicates a first amount of resources allocated to a plurality of areas. The device may determine a set of attacker expected rewards based on the initial allocation data. The device may determine a set of defender expected rewards based on the attacker expected rewards. The device may determine moving rewards indicating defensive scores in response to movement of the resources among the plurality of areas. The device may determine defender response rewards indicating defensive scores resulting from an optimal attack on the plurality of areas. The device may generate reallocation data indicating an allocation of a second amount of resources to the plurality of areas. The second amount of resources may maximize the moving rewards and the defender response rewards.

Figure 1:
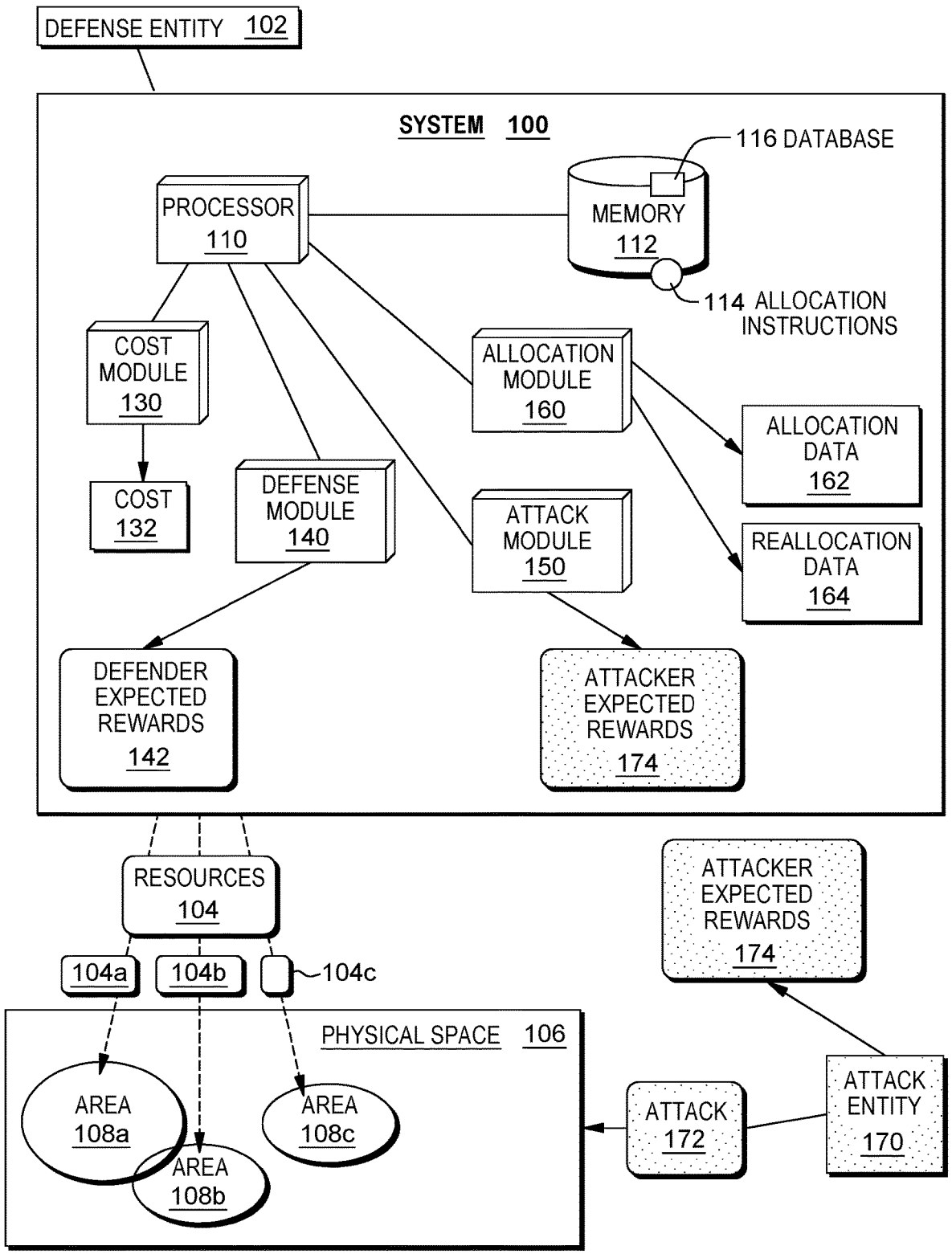
FIG. 1 illustrates an example computer system that can be utilized to implement resource reallocation based on expected rewards.

FIG. 1 illustrates an example computer system 100 ("system 100") that can be utilized to implement resource reallocation based on expected rewards, arranged in accordance with at least some embodiments described herein. In some examples, system 100 may be a computer system, and may include a processor 110, a memory 112, a cost module 130, a defense module 140, an attack module 150, and/or an allocation module 160. Processor 110, memory 112, cost module 130, defense module 140, attack module 150, and/or allocation module 160 may be configured to be in communication with each other.

In some examples, processor 110, memory 112, cost module 130, defense module 140, attack module 150, and/or allocation module 160 may be housed, or distributed, in a same housing and/or a computer device. In some examples, processor 110, memory 112, cost module 130, defense module 140, attack module 150, and/or allocation module 160 may be housed, or distributed, in two or more different housings and/or computer devices. For example, processor 110 and memory 112 may be distributed in a first device and cost module 130, defense module 140, attack module 150, and/or allocation module 160 may be distributed in a second device different from the first device. In some examples, arrangements and/or distributions of processor 110, memory 112, cost module 130, defense module 140, attack module 150, and/or allocation module 160 may be based on a desired implementation of system 100. In some examples, processor 110, memory 112, cost module 130, defense module 140, attack module 150, and/or allocation module 160 may be components of a computer device operated by defense entity 102.

In some examples, processor 110, memory 112, cost module 130, defense module 140, attack module 150, and/or allocation module 160 may each be hardware components or hardware modules of system 100. In some examples, cost module 130, defense module 140, attack module 150, and/or allocation module 160 may each be a hardware component, or hardware modules, of processor 110. In some examples, processor 110 may be a central processing unit of a computer device. In some examples, processor 110 may control operations of cost module 130, defense module 140, attack module 150, and/or allocation module 160. In some examples, each one of cost module 130, defense module 140, attack module 150, and/or allocation module 160 may include electronic components, such as integrated circuits. In some examples, each one of cost module 130, defense module 140, attack module 150, and/or allocation module 160 may be software modules that may be implemented with processor 110, or may be software modules that may be implemented with processor 110 to execute respective threads (e.g., map threads, reduce threads, shuffle threads, etc.). In some examples, processor 110 may be configured to run an operating system that includes instructions to manage memory 112, cost module 130, defense module 140, attack module 150, and/or allocation module 160.

Memory 112 may be configured to store allocation instructions 114. Allocation instructions 114 may include one or more set of instructions to facilitate implementation of system 100. In some examples, allocation instruction 114 may include instructions executable by an operating system running on processor 110. In some examples, memory 112 may be a main memory of a device configured to implement system 100.

System 100 may be associated with, and may be controlled or operated by, a defense entity 102 ("defender"). Examples of defense entity 102 may include, but not limited to, a security agency, a government agency, a law enforcement agency, etc. Defense entity 102 may implement system 100 to determine an allocation of a set of security resources ("resources") 104 to a plurality of physical areas, such as areas 108a, 108b, 108c, among a physical space 106. Some examples of resources 104 may include, but not limited to, law enforcement officers and equipments, surveillance systems, sensors, computer devices, military personnel and equipments, etc. Examples of a physical space 106 may include, but not limited to, an airport, a shopping mall, an arena, theme parks, locations to host venues, one or more cities, states, countries, etc. Each area 108 may be partitions of physical space 106, such as a terminal in an airport, a section of a shopping mall, arena, theme parks, a city, a state, etc.

In some examples, a security entity (defense entity 102) may be assigned to protect one or more distributed physical areas (physical space 106) with a limited amount of security resources (resource 104). The security entity may allocate the security resources to each physical area (areas 108). An allocation of the security resources may be represented as a vector to indicate an amount of resource allocated to each physical area. Further, vector representation may be used to represent a normalized resource allocation that may indicate a percentage of total security resources allocated to each area. Allocation module 160 of system 100 may determine initial allocation data 162 (or, determine the vector representation described above) that indicates a portion of resources 104 being allocated, or distributed, to each area 108. For example, initial allocation data 162 may include data indicating that portions 104a, 104b, 104c of resources 104 are allocated to areas 108a, 108b, 108c, respectively.

In some examples, a number of security resources may be significantly larger than a number of physical areas. Further, security resources may be dividable, such as being dividable based on budget or total patrol time. For example, different groups of law enforcement officers may patrol different areas for a different amount of patrol time, or each area may be assigned to a different amount of monetary budget to purchase security equipment for the corresponding area. By initializing the number of security resources to be significantly larger than the number of physical areas, system 100 may have the flexibility to allocate an arbitrary fraction of security resources to each physical area.

In an example shown in FIG. 1, upon determination of initial allocation data 162 of resources 104 by system 100, an attack entity may perform surveillance on physical areas to determine allocation of resources for each physical area. For example, an attack entity 170 ("attacker") may survey physical space 106 to determine an amount of resources 104 allocated to each area 108 to determine initial allocation data 162. Examples of attack entity may include, but not limited to, malevolent entity such as one or more criminals, terrorists, hackers, etc.

Each potential attack to be performed by an attack entity may generate an attack reward represented as a function of security resources allocated in a corresponding physical area, and may be represented as a convex decreasing function. As such, as a number of resources allocated to an area increases, an attacker expected reward for the area may decrease. In the example shown in FIG. 1, based on initial allocation data 162, attack entity 170 may determine an attacker expected reward 174 for each area 108, where each attacker expected reward 174 may be associated with a result of performing an attack 172 on a corresponding area 108 of physical space 106. Attack entity 170 may determine expected attack reward associated with each physical area 108 based on initial allocation data 162 of security resources 104. Attack entity 170 may further select a physical area to perform an attack based on the determined attacker expected rewards. For example, a terrorist may survey physical space 106 to determine that a relatively small amount of law enforcement officers is allocated to area 108c and thus, may determine that performing an attack 172 on area 108c may result in a maximum amount of casualties (attacker expected reward 174).

Each potential successful attempt to defend a physical area 108 may generate a defender expected reward 142 for defense entity 102. Defender expected reward 142 may be represented as a concave increasing function, and may be based on a corresponding area being attacked and the percentage of security resources allocated in the attacked area. As such, as a number of resources allocated to an area increases, a defender expected reward for the area may increase as well. For example, defender expected reward 142 may be associated with a number of casualties during an attack, and an optimal amount of defender expected reward 142 may be zero, or minimal, casualties.

As will be described in more detail below, in addition to defender expected reward 142, system 100 may also determine attacker expected reward 174 based on initial allocation data 162 and, in response, may alter initial allocation data 162 to determine reallocation data 164 of resources 104 in physical space 106. Reallocation data 164 may indicate an optimal allocation, in which a defender expected reward is maximized under a condition that attack entity 170 may be aware of the allocation of resources indicated by initial allocation data 162. System 100 may further determine optimal path data that indicates a strategy and/or path to reallocate security resources 104. For example, optimal path data may indicate an optimal strategy when defense entity 102, or system 100, is requested to alter an initial allocation of security resources 104 gradually to a targeted (or optimal) allocation within a plurality of time epochs. The optimal path data may further indicate a constraint for system 100 to alter a relatively small amount of security resources 104 in each time epoch.

In some examples, each alteration to initial allocation data 162 of security resources 104 may result in a transition cost ("cost") 132. System 100 may alter initial allocation data 162 of security resources 104 and dynamically determine transition cost 132 in response to each alteration. Further, system 100 may alter initial allocation data 162 based on potential attacks in each time epoch. As such, system 100 may be configured to determine a maximized defense reward based on a reallocation process that may include an accumulated cost of alterations performed at each time epoch, and may include an accumulated reward and/or penalty in response to an attack.

As will be described below, system 100 may be implemented to determine a set of solutions for various formulations, or models, of problems in consideration of various constraints. The determined solutions may include a recommended amount of resources to be reallocated to areas 108. The solutions may be determined based on a determination of attacker expected rewards 174, where attacker expected rewards 174 may be based on an assumption that attack 172 may be performed on areas 108 when areas 108 are allocated with resources according to initial allocation data 162. Further, determination of the solutions may be based on formulations associated with multi-stage, zero-sum security games wherein utility functions for both players (e.g., functions representing defender expected reward 142 and attacker expected reward 174) are piecewise linear functions and monotonic (e.g., the function is always non-increasing or non-decreasing). Such formulations may be analogous to modulating the transition probabilities in a constrained Markov Decision Process that is targeting a desired end-state in expectation. Further, the formulations may address uncertainties in attacker types as well as risk-averse players objectives. Furthermore, formulations associated with general-sum, monotonic convex utility functions may be used to implement system 100, where adaptive discretization technique to approximate the underlying optimal solution may be performed to achieve a desired accuracy.

Figure 2:
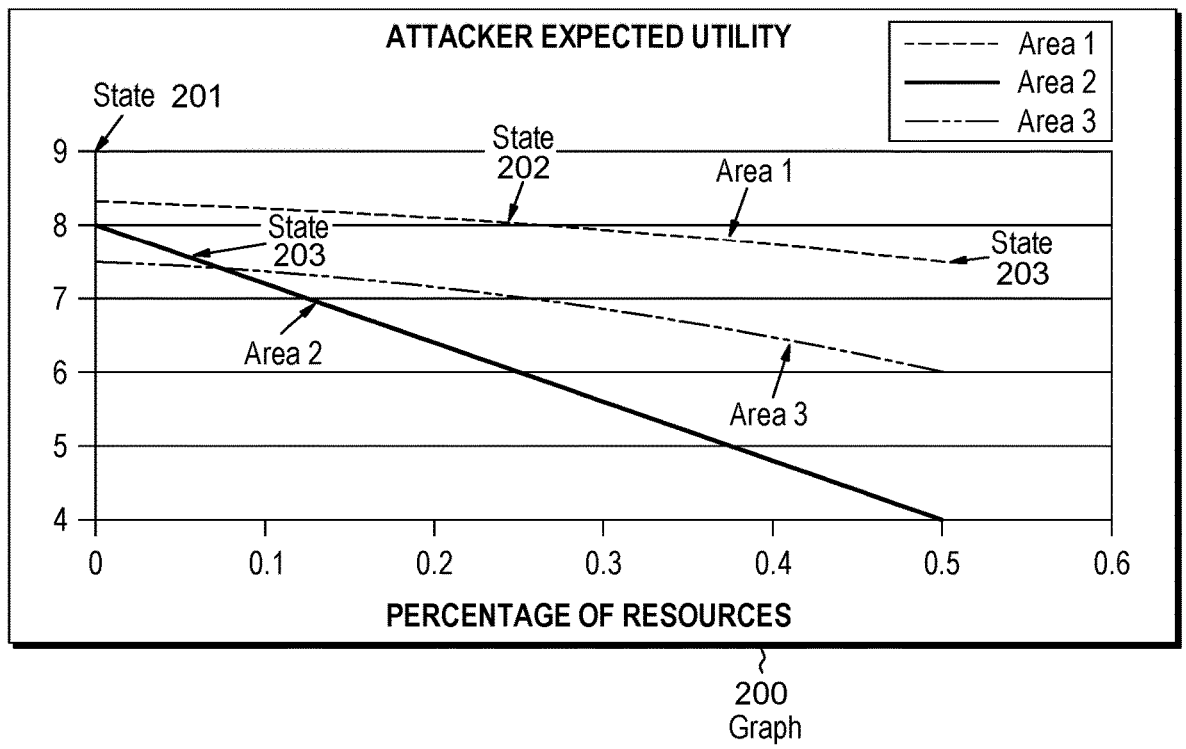
FIG. 2 illustrates the example system of FIG. 1 with additional details relating to resource reallocation based on expected rewards.
Figure 2:
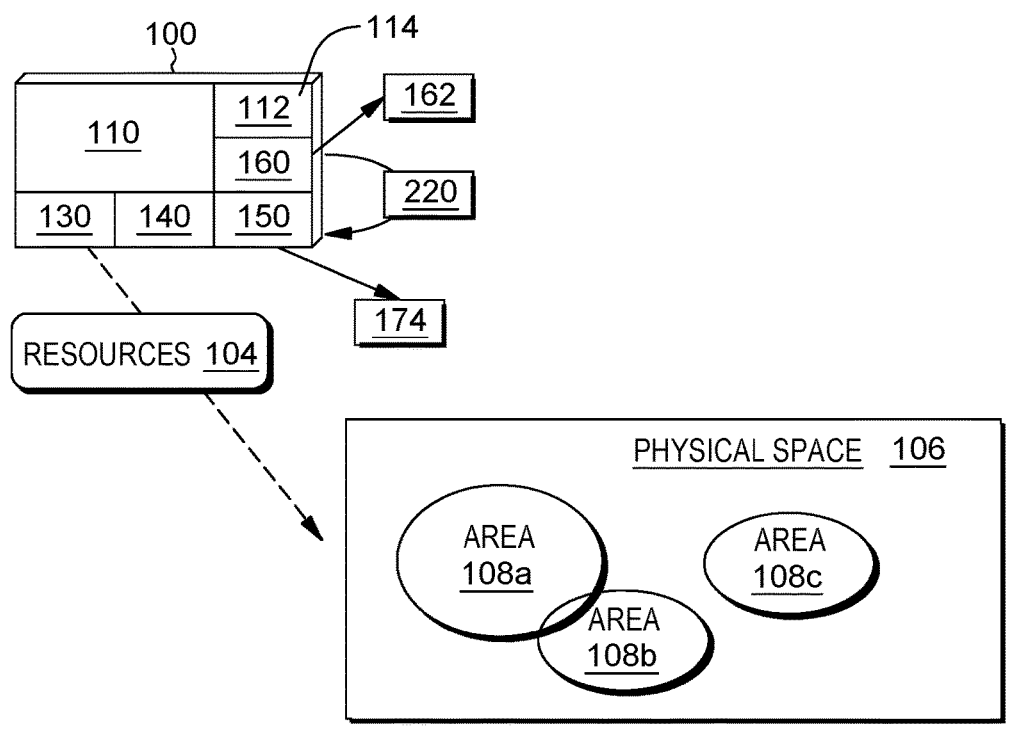

FIG. 2 illustrates the example system of FIG. 1 with additional details relating to resource reallocation based on expected rewards, arranged in accordance with at least some embodiments described herein. FIG. 2 is substantially similar to computer system 100 of FIG. 1, with additional details. Those components in FIG. 2 that are labeled identically to components of FIG. 1 will not be described again for the purposes of clarity.

In an example, determination of initial allocation data 162, reallocation 164, attacker expected reward 174, and defender expected reward 142 may be based on a Stackelberg game model, where a defender (defense entity 102) may commit to an allocation or a re-allocation process and an attacker (attack entity 170) may select a best response and break ties in favor of the defender. Table 1 below lists at least some of the notations that may be used in a Stackelberg game model, and in at least some of the examples presented below.

TABLE 1

Notation Table.

| | |
|---|---|
| N | Number of areas |
| H | Number of resources (H >> N) |
| T | Number of epochs |
| $u_{i,j}^t$ | Percentage of security resources that are in area i at time t and in area j at time t + 1 |
| $d_i^t$ | Percentage of security resource in area i at time t |
| $\alpha_i$ | Initial distribution of security resource at time 0 |
| $\beta_i$ | Final distribution of security resource that must be satisfied at time T |
| $c_{i,j}$ | Cost of moving one unit of resource from area i to area j |
| $f_i^d(x)$ | Expected reward function for the defender when attacker attacks area i and the percentage of security resource in area i is x |
| $f_i^a(x)$ | Expected reward function for the attacker when attacker attacks area i and the percentage of security resource in area i is x |
| $q_i^t$ | Binary variable, indicating the best response of the attacker. $q_i^t = 1$ means the attacker will potentially attack target i at time t and $q_i^t = 0$ otherwise |

In an example, system 100 may execute allocation instruction 114 in order to determine an optimal initial allocation (initial allocation 162). Allocation instructions 114 may include instructions to indicate that a representation of initial allocation data 162 shall be linear, piecewise linear, and/or monotonic functions. Thus, resources 104 may be allocated to an attack set including areas with maximum attacker expected utility, or attacker expected reward, where the expected utility among areas in the attack set are the same. In other words, the attack set may include areas that are most lacking in resources and most likely to be targeted by an attacker. To determine an optimal allocation for an area based on allocation instructions 114, processor 110 may first sort attacker expected rewards 174 for each area 108, under the assumption that no resources are initially allocated to areas 108, in a decreasing order, where attacker expected rewards 174 may be determined by attack module 150. For example, attack module 150 may determine attacker expected rewards 174 for an area based on an amount of resources allocated to the area and various factors, such as a time of the day, a day of a week, a weather of the day, a population density, etc. In some examples, attack module 150 may determine attacker expected rewards 174 by learning a function based on previous attack patterns. For example, attack module 150 may receive a set of training data including training inputs and training labels, where the training inputs may be amounts of allocated resources and the training labels may be amounts of casualties or damages resulting from a corresponding allocated resource amount. Attack module 150 may learn a function based on the training data such as by using regression methods, and/or by fitting models, such as mathematical models of particular properties (e.g., convex-decreasing, concave increasing, etc.), to the training data, to obtain a function that may represent attacker reward expected reward for various amounts of resources. Similarly, defense module 140 may learn a function based on training data to represent defender expected awards 142.

Using the above notations from Table 1, $f_i^a(x)$ may denote attacked expected rewards 174 for an area i when x amount of resources 104 are allocated to area i (a is simply a notation for attack). In an example shown in FIG. 2, areas 108a, 108b, 108c are denoted as areas i=1, i=2, i=3, or Area 1, Area 2, Area 3, respectively. Focusing on graph 200, when no resources are allocated to areas 108 (state 201), attacker expected rewards 174 for areas 108a, 108b, 108c may be represented as numerical scores such as $f_1^a(0)=8.25$ (for Area 1), $f_2^a(0)=8$ (for Area 2), $f_3^a(0)=7.5$ (for Area 3).

Upon the sorting operation, allocation module 160 may gradually allocate resources 104 to an area with the highest attack reward, such as Area 1. For example, allocation module 160 may allocate a relatively small amount of resources 104 (e.g., one percent, five percent, etc.) to Area 1. Upon each allocation, allocation module 160 may send the amount of resources allocated to Area 1 to attack module 150 in order for attack module 150 to determine an updated attack reward for Area 1. For example, allocation module 160 may allocate one percent of resource 104 to Area 1 and may send allocation data 220 to attack module 150, where allocation data 220 may indicate one percent of resource 104. Attack module 150 may receive allocation data 220 and, in response, may update attacker expected reward 174 for Area 1. In an example, upon allocating one percent of resources 104 to Area 1, attacker expected rewards 174 for Area 1 may be decreased to a score of '8.20'. Allocation module 160 may continue to allocate resources 104 to Area 1 until attacker expected rewards 174 for Area 1 is equivalent, or substantially the same, to attacker expected reward 174 of a next area (Area 2) indicated in the sorted order at initial state 201. For example, allocation module 160 may allocate resources 104 to Area 1 until $f_1^a(x_1^1)=f_2^a(0)$, where $x_i^t$, denote amount of resources allocated to area i at time t. Thus, when attacker expected reward 174 for Area 1 is decreased to a score of '8.25' (at state 202), attack module 150 may notify allocation module 160 that an equivalence is reached. In some examples, allocation module 160 may determine $x_1^1$ based on an inverse function of $f_1^a(x)$, or based on a binary search. At state 202 approximately twenty-five percent of resources have been allocated to Area 1 (such that $f_1^a(0.25)=f_2^a(0)$), and thus, seventy-five percent of resources 104 are remaining to be allocated.

Upon reaching an equivalence of attacker expected rewards 174 between Area 1 and Area 2, allocation module 160 may continue to allocate the remaining seventy percent of resources 104 between Areas 1, 2, 3, until an equivalence of attacker expected rewards 174 among Areas 1, 2, 3 are reached (e.g., $f_1^a(x_1^2)=f_2^a(x_2^2)=f_3^a(0)$). State 203 shown in FIG. 2 indicates a situation where an equivalence of attacker expected rewards 174 is reached between areas 108a, 108b, 108c, where approximately 50% of resources 104 are allocated to Area 1, and approximately 7.5% of resources are allocated to Area 2 (e.g., $f_1^a(0.50)=f_2^a(0.075)=f_3^a(0)$) and thus, 42.5% of resources 104 are remaining to be allocated.

Upon reaching an equivalence of attacker expected rewards 174 between Areas 1, 2, 3, allocation module 160 may continue to allocate the remaining resources 104 between Areas 1, 2, 3, until all of resources 104 are allocated. In the example, since Area 3 is the last area among areas 108, allocation of the remaining resources may be performed until all of resources 104 are allocated. If there is an additional area to Areas 1, 2, 3, allocation of resources 104 may be performed until an equivalence among all four areas are reached, or until all of resources 104 are allocated. By executing allocation instructions 114, resources 104 may be optimally allocated among different areas. In some examples, allocation instructions 114 may be applied to non-convex and/or non-concave functions as long as the functions are monotonic. Allocation module 160 may generate initial allocation data 162 to indicate resources 104 that are allocated to areas 108.

Figure 3:
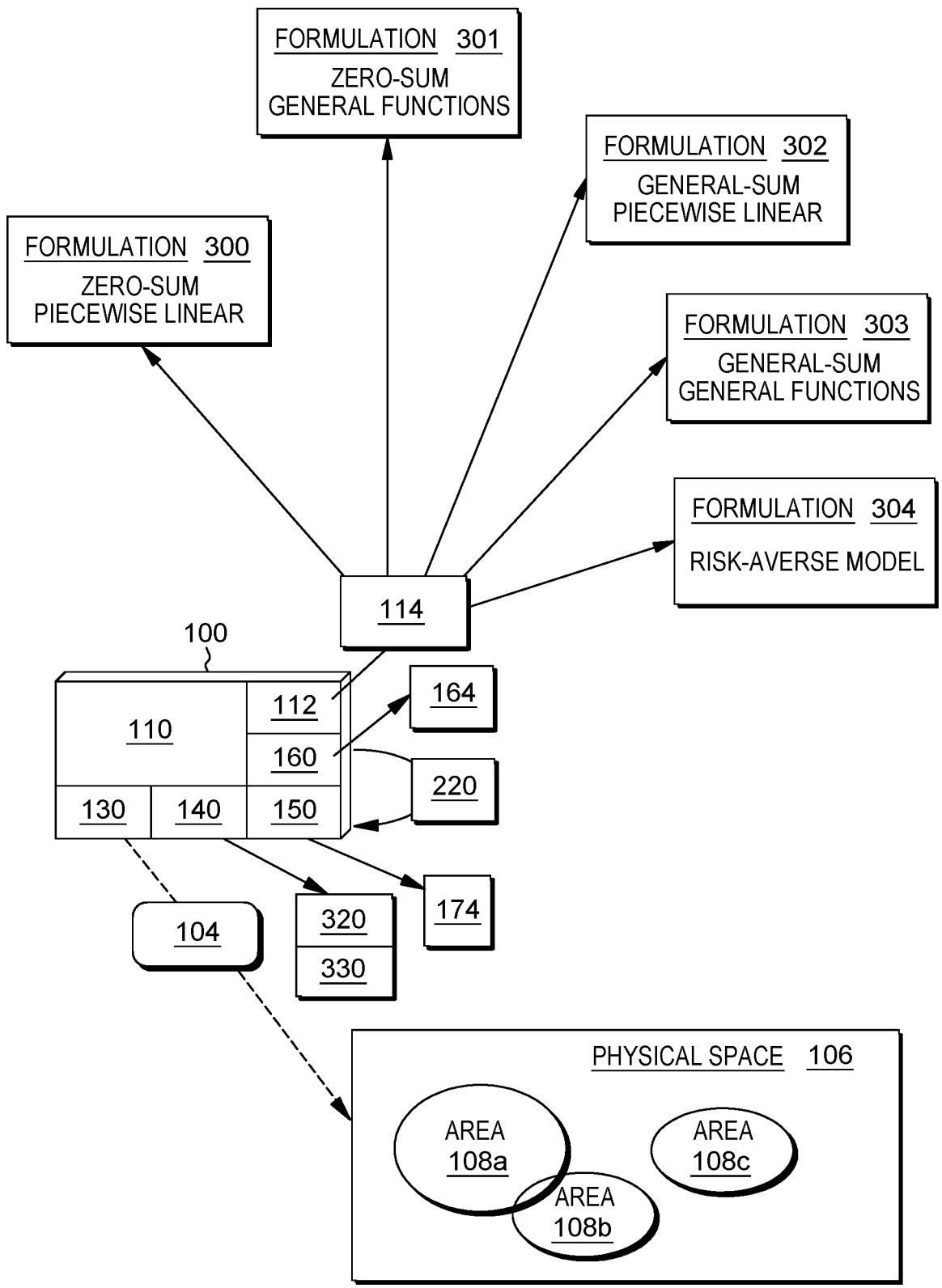
FIG. 3 illustrates the example system of FIG. 1 with additional details relating to resource reallocation based on expected rewards.

FIG. 3 illustrates the example system of FIG. 1 with additional details relating to resource reallocation based on expected rewards, arranged in accordance with at least some embodiments described herein. FIG. 3 is substantially similar to computer system 100 of FIG. 1 and FIG. 2, with additional details. Those components in FIG. 3 that are labeled identically to components of FIG. 1 and FIG. 2 will not be described again for the purposes of clarity.

Various linear programming formulations 300, 301, 302, 303, 304 may be included in allocation instructions 114, and may be used by system 100 to determine reallocation data 164. In an example, a formulation may be a data package, where each piece of data may include indications of one or more objective functions, decision variables, and constraints. In an example shown in FIG. 3, a formulation 300 may be based on zero-sum games with piecewise linear expected reward functions (e.g., functions representing defender expected reward 142 and attacker expected reward 174 are piecewise linear). A formulation 301 may be based on zero-sum games with general functions (e.g., functions representing defender expected reward 142 and attacker expected reward 174 may be arbitrary). A formulation 302 may be based on general-sum games with piecewise linear expected reward functions. A formulation 303 may be based on general-sum games with general functions.

In an example where formulation 300 may be based on a known attacker type, formulation 300 may be analogous to modulating transition probabilities in a constrained Markov Decision Process that is targeting a desired end-state in expectation. Formulation 300 based on a known attacker type may include the following objective function (1) and constraints (2) to (10):

$$\max_{u,d,v} \Sigma_t (R_m^t + v^t) \tag{1}$$

$$v^t \le a_i^j d_i^t + b_i^j \tag{2}$$

$$v^t \in R \tag{3}$$

$$\Sigma_i d_i^t = 1 \tag{4}$$

$$|d_i^{t+1} - d_i^t| \le \in \tag{5}$$

$$d_i^t = \Sigma_j u_{ij}^t \tag{6}$$

$$d_j^{t+1} = \Sigma_i u_{ij}^t \tag{7}$$

$$d_i^0 = \alpha_i \tag{8}$$

$$d_i^T = \beta_i \tag{9}$$

$$u_{ij}^t, d_i^t \in [0,1] \tag{10}$$

Among formulation 300, $v^t$ may denote a defender reward at a time t. Since formulation 300 is based on a zero-sum game, defender reward $v^t$ may correspond to a best response from the attacker at time t. Constraint (2) may represent an optimal response from attack entity 170. For example, $a_i^j d_i^t + b_i^j$ may represent a response (or, an attack) from attack entity 170, where the response may be based on percentages of resources $d_i^t$, indicated by initial allocation data 162, and $a_i^j$, $b_i^j$ may be parameters associated with the response. In some examples, allocation module 160 may send initial allocation data 162 to attack module 150 in order for attack module 150 to simulate attack entity 170 and determine the responses based on initial allocation data 162.

At the end of each time epoch t, attack entity 170 may select an area that minimizes an expected utility of defense entity 102 (e.g., an area with minimum defender expected reward) due to the formulation being based on a zero-sum game (i.e., the defender's expected reward is the minimum value among all areas). Attack module 150 may simulate attack entity 170 and may identify a targeted area among areas 180 based on attacker expected rewards 174, where the targeted area may be associated with a greatest score among attacker expected rewards 174. As such, defender reward $v^t$ may change over time. Due to defender expected reward 142 being represented by a concave and piecewise linear function, defender expected reward 142 may be represented as a minimum of multiple linear functions, i.e. $f_i^d(x) = \min_{j \in J_i} a_i^j x + b_i^j$. Notation $d_i^t$ may denote a percentage of security resource in area i at time t. Notation $u_{ij}^t$ may denote a percentage of security resources that are in area i at time t and in area i at time t+1. Constraint (4) may represent a condition to ensure the elements in the allocation vector add up to 1 (all percentages of resources among areas 108 add up to 1). Constraint (5) may represent a condition to restrict the resources being moved in each area in each epoch, such that resources being moved are no greater than ∈, which denotes a maximum amount of resource change in a single time epoch in each area. Constraints (6) and (7) may represent a flow conservation property, in order to ensure that resources are being moved from one area to another instead of adding additional resources to resources 104, or removing resources from resources 104. Constraints (8) and (9) may represent an initial and a target allocation, respectively, where $\alpha_i$ and $\beta_i$ may be each be a set of arbitrary values and each element among $\alpha_i$ and $\beta_i$ may indicate a percentage. Notation T may denote a total number of time epochs.

Notation $R_m^t$ may denote a set of moving rewards 320, where each moving reward 320 may indicate a defense reward in response to movement of resources among areas 108 in a time epoch t. Defense module 140 may be configured to determine moving rewards 320. Moving rewards 320 may be represented by different functions, such as:

$$R_m^t = -\Sigma_{i,j} H c_{i,j} u_{ij}^t$$

or $$R_m^t = -\Sigma_i H \gamma |d_i^{t+1} - d_i^t|$$

Notation $c_{ij}$ may denote cost 132 determined by cost module 130, which may be a cost of moving, or reallocating, one or more resources from an area i to an area j, and may also represent a transition probability, such that $c_{ij}^t = u_{ij}^t d_i^t$. In some examples, cost 132 may be provided to system 100 as an input to system 100. In some examples, a value of cost 132 may increase as a distance between area i and area j increases. In some examples, a user of system 100 may define various parameters for cost module 130 to determine cost 132. For example, the user may define instructions to determine cost 132 based on distances between areas, the type of resources being reallocated, monetary cost of moving resources among areas, etc. Notation H may represent a number of resources, and where the number of resources may be significantly larger than a number of areas. In an example, defense module 140 may receive $c_{ij}$, $u_{ij}^t$, $d_i^t$, H, and/or γ as inputs in order to determine moving rewards 320. Notation γ may denote a constant that may be interpreted as a single step discount rate that scales a difference between the net total resources in each location across two consecutive time steps. In an example, allocation module 160 may receive $c_{ij}$, T, ∈, $\alpha_i$ and $\beta_i$ as inputs in order to determine reallocation data 164.

In an example where formulation 300 is based on an unknown attacker type, there may be K types of attackers and at the end of each epoch t, each attacker type k may appear with equal probability 1/K, and the uncertainty may be independent across the epochs t. Under the conditions of a zero-sum game (i.e., the defender will always achieve the corresponding expected reward which is negative to the attacker's expected reward), the attacker expected reward 174 may be denoted as $f_{ik}^a$, which may be a function of area i for attacker type k, and which may include a set of linear functions $a_{ik}^j x + b_{ik}^j$, where $j \in J_k^i$. Thus, an optimal defender expected reward for defense entity 102 may be $f_{ik}^d = \min_{j \in J_k^i}(a_{ik}^j x + b_{ik}^j)$ (e.g., the defense would want to minimize the linear equations included in attacker expected rewards 174), and such that defender expected reward at each time epoch t may be optimized by $v_k^t = \min_i f_{ik}^d(d_i^t)$.

In order to address the uncertainty of attack types, a risk averse model (described below) may be used to bound a tail risk of highly undesired outcomes. In an example, a random variable $\tilde{V}^t$ may represent the expected reward for the defender when faced with an attack at the end of epoch t. In the risk averse model, both the expectation of $\tilde{V}^t$ and a value that measures the most undesired reward (lowest rewards) for the defender, represented as $-CVaR(-\tilde{V}^t)$. CVaR may denote conditioned value at risk, and may be executed by defense module 140 to determine the average of a tail (highest values) of a random variable distribution via an optimization problem shown below:

$$-CVaR(-\tilde{V}^t) = -\min_\eta \left\{ \eta + \frac{1}{1-\tau} E\left[ -\tilde{V}^t - \eta \right]^+ \right\}$$

$$= \max_\eta \left\{ -\eta - \frac{1}{1-\tau} E\left[ -\tilde{V}^t - \eta \right]^+ \right\}$$

$$= \max_\eta \left\{ \eta - \frac{1}{1-\tau} E\left[ \eta - \tilde{V}^t \right]^+ \right\}$$

Formulation 300 based on an unknown attack type may include constraints (4) to (10), and in addition, and objective function (11), and constraints (12) to (16) as shown below:

$$\max_{u,d,v,\eta} \Sigma_t (R_m^t + R_d^t) \quad (11)$$

$$R_d^t = \lambda \Sigma_k \frac{1}{K} v_k^t + (1-\lambda)\left( \eta^t - \frac{1}{K(1-\tau)} \Sigma_k y_k^t \right) \quad (12)$$

$$v_k^t \leq a_{ik}^j d_i^t + b_{ik}^j \quad (13)$$

$$v_k^t \in R \quad (14)$$

$$y_k^t \geq 0 \quad (15)$$

$$y_k^t \geq \eta^t - v_k^t \quad (16)$$

Constraint (13) may represent a condition, where $v_k^t$, denotes a defender reward when attack of type k shows up and plays a best response (e.g., $v_k^t = \min_i f_{ik}^d(d_i^t)$). $R_d^t$ may represent a set of defender response rewards 330 for defense entity 102 when defense entity 102 encounters with attack 172 at the end of a time epoch t. In some examples, defender response rewards 330 may be an update to defender expected rewards 174 in response to attack 172 being performed on a corresponding area at a time epoch. Constraint (12) may indicate defender response rewards 330 $R_d^t$ may be a weighted sum of the average defender reward $v_k^t$ and the average of the most undesired expected reward (denoted as $y_k^t$), where the weight may be parameterized by $\lambda$, and $1-\tau$ indicates the percentage of undesired reward that needs to be considered. In some examples, $y_k^t$ may represent the extent of underage in the random reward (random due to uncertainty in attacker type k) at time t, that is under and below a lower quantile of the random reward distribution, which is captured by $\eta^t$. Taken together through the expression in the second term in constraint (12), (i.e. the term that is multiplied by $(1-\lambda)$, the second term may capture the expected undesirable rewards that are below a certain quantile of the reward distribution.]$R_d^t$ may be represented as a risk averse objective function in consideration of tail risk, that may be based on an expected value of random variable $\tilde{V}^t$ and $-CVaR(-\tilde{V}^t)$. As such, $R_d^t$ indicated in constraint (12) may also be represented as $R_d^t = \Delta E[\tilde{V}^t] + (1-\Delta)(-CVaR[-\tilde{V}^t])$. In an example, defense module 140 may be configured to determine $v_k^t$ and $y_k^t$, and may receive), $\lambda$, $\tau$, $\eta^t$, and/or K, as inputs in order to determine defender response rewards 330.

Defense module 140 may be configured to determine both moving rewards 320 ($R_m^t$) and defender response rewards 330 ($R_d^t$). Defense module 140 may send moving rewards 320 ($R_m^t$) and defender response rewards 330 ($R_d^t$) to allocation module 160.

Allocation module 160 may identify objective function (11) in formulation 300 among allocation instructions 114, and constraints necessary to determine reallocation data 164. To determine reallocation data 164, allocation module 160 may, for example, determine a set of solutions to the objective function indicated by constraint (11) based on constraints (4) to (16).

In some examples, determination of a set of solutions to the objective function indicated by constraint (11) may include executing, by allocation module 160, various techniques indicated by allocation instruction 114 including, but not limited to, regression techniques, linear programming, approximation techniques, etc. Determination of a set of solutions to the objective function indicated by constraint (11) may include maximizing or minimizing one or more components and/or subcomponents among the objective function. For example, in order to maximize $R_d^t$, allocation module 160 may maximize $E[\tilde{V}^t]$, such as by assigning different parameters to different types of random variables to represent $\tilde{V}^t$. A set of solutions to the objective function indicated by constraint (11) may include a set of values for $d_i^t$, such that reallocation data 164 may indicate an amount of resources that are recommended to be allocated to each area 108 at each time epoch t. The determined solutions may be updated values of $d_i^t$, such that reallocation data 164 may be an update to initial allocation data 162.

In an example, formulation 301 may be based on using general functions to represent expected rewards instead of piecewise linear functions. As such, constraint (2) may no longer be applicable, and formulation 301 may include constraints (4) to (10) and objective function (17), and constraints (18), (19)) shown below:

$$\max_{u,d,v} \Sigma_t(R_m^t + v^t) \quad (17)$$

$$v^t \leq f_i^d(d_i^t) \quad (18)$$

$$v^t \in R \quad (19)$$

The defender expected rewards functions $f_i^d(x)$ indicated in constraint (18) may be concave functions. Constraint (18) may include a convex feasible space (see constraint (19)) and thus, a problem based on formulation 301 may be solvable by convex programming techniques, which may be included in allocation instructions 114. In another example, approximated piecewise linear functions may be used instead of general functions and/or piecewise linear functions. For example, rewards function represented as general functions may be approximated, or converted, to piecewise linear functions. Due to formulation 301 being based on a zero-sum game, a defender strategy that is arbitrarily close to the optimal strategy with sufficiently fine-grained discretization may be obtained.

Defense module 140 may be configured to determine both moving rewards 320 ($R_m^t$) and defender rewards ($v^t$). Defense module 140 may send moving rewards 320 ($R_m^t$) and defender rewards ($v^t$) to allocation module 160. Allocation module 160 may identify objective function (17) in formulation 301 among allocation instructions 114, and constraints necessary to determine reallocation data 164. To determine reallocation data 164, allocation module 160 may, for example, determine a set of solutions to the objective function indicated by constraint (17) based on constraints (4) to (10) and (18), (19).

In another example, formulation 302 based on general-sum games (instead of zero-sum games) may be used to determine reallocation data 164. In formulation 302, a set of integer variables may denote a choice of the attacker, and formulation 302 may include constraints (4) to (10), and objective function (20) and constraints (21) to (26) as shown below:

$$\max_{u,d,a,q,v} \Sigma_t (R_m^t + v^t) \quad (20)$$

$$v^t - f_i^d(d_i^t) \leq (1-q_i^t)M \quad (21)$$

$$v^t \in R \quad (22)$$

$$0 \leq a^t - f_i^a(d_i^t) \leq (1-q_i^t)M \quad (23)$$

$$a^t \in R \quad (24)$$

$$\Sigma_i q_i^t = 1 \quad (25)$$

$$q_i^t \in \{0,1\} \quad (26)$$

Constraint (23) may indicate that the attacker may play best response with respect to a strategy of the defender. Notation M may denote a large real number relative to the maximum defender expected reward value. Notation $q_i^t$ may be a binary variable indicating whether or not an area i will be attacked at time t. Note that in constrain (21), $v^t = f_i^d(d_i^t)$ when $q_i^t = 1$. In constraint (23), $a^t = f_i^a$ if $q_i^t = 1$, and $a^t \geq f_i^a(d_i^t)$ if $q_i^t = 0$, where $a^t$ may be an attack reward for an attacker when an attack is performed. Constraint (25) denotes a restriction that only one area will be attacked.

Components in formulation 302 may be linear except for functions $f_i^d(x)$ and $f_i^a(x)$. When the functions are piecewise linear, variables and constraints may be added and subsequently, formulation 302 may be convert into a mixed-integer linear programming (MILP) formulation by using a standard process. For example, if $f_i^d(x)$ is piecewise linear in $x \in [0,1]$ with three pieces $[0, \theta_1]$, $[\theta_1, \theta_2]$, $[\theta_2, 1]$, then continuous variables $\delta_1, \ldots, \delta_3$ and integer variables $\omega_1, \ldots, \omega_3$ and a set of constraints, shown below, may be added to formulation 302:

$$d_i^t = \delta_1 + \delta_2 + \delta_3$$

$$\omega_1 \theta_1 \leq \delta_1 \leq \theta_1$$

$$\omega_2(\theta_2 - \theta_1) \leq \delta_2 \leq \omega_1(\theta_2 - \theta_1)$$

$$0 \leq \delta_3 \leq \omega_2(1-\theta_2)$$

$$\omega_1, \omega_2 \in \{0,1\}$$

Thus, $f_i^d(d_i^t)$ may be represented as a linear summation of $\delta_1, \ldots, \delta_3$. Defense module 140 may be configured to determine both moving rewards 320 ($R_m^t$) and defender rewards ($v^t$). Defense module 140 may send moving rewards 320 ($R_m^t$) and defender rewards ($v^t$) to allocation module 160. Allocation module 160 may identify objective function (20) in formulation 302 among allocation instructions 114, and constraints necessary to determine reallocation data 164. To determine reallocation data 164, allocation module 160 may, for example, determine a set of solutions to the objective function indicated by constraint (20) based on constraints (4) to (10) and (21) to (26).

Figure 4:
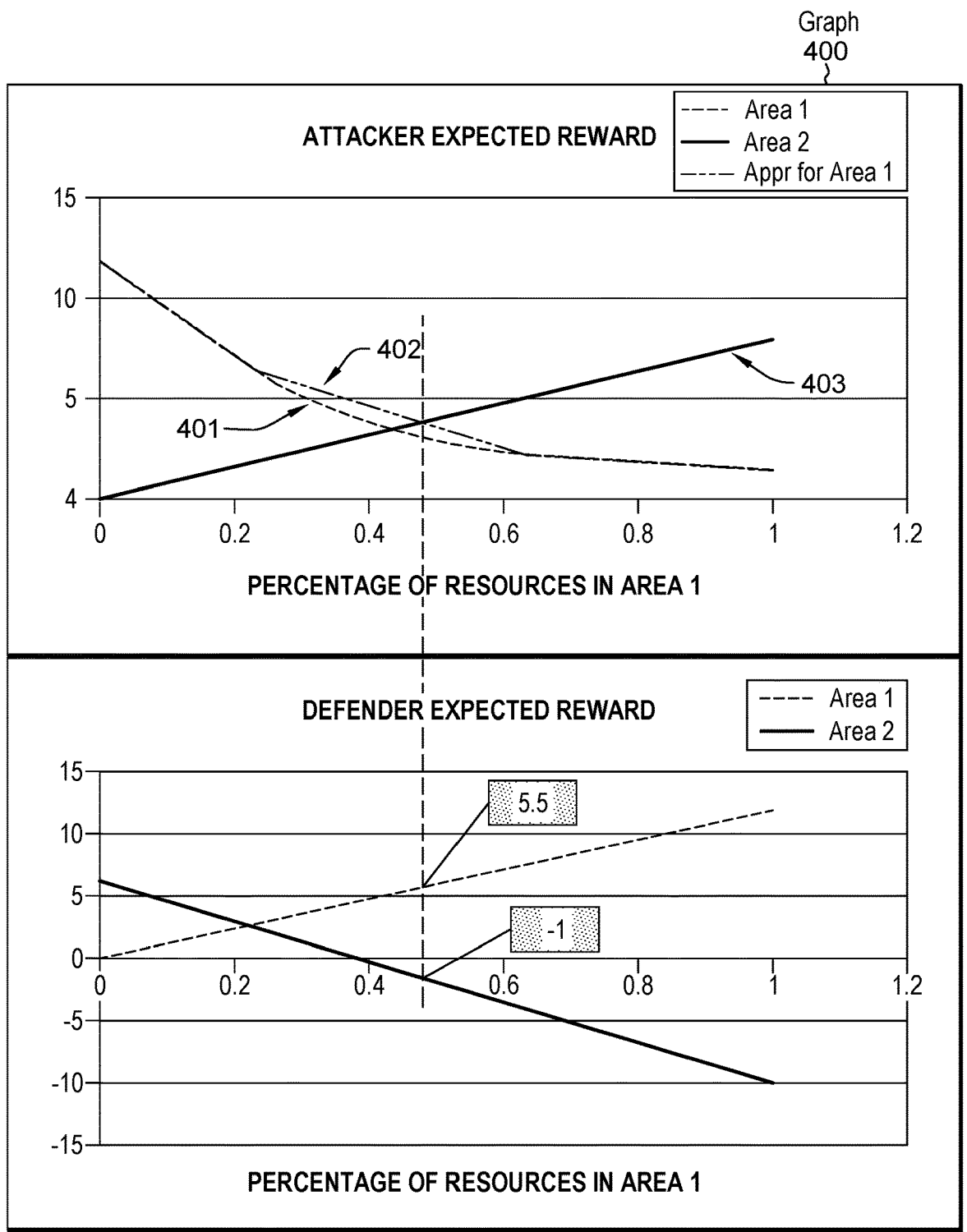
FIG. 4 illustrates the example system of FIG. 1 with additional details relating to resource reallocation based on expected rewards.

FIG. 4 illustrates the example system of FIG. 1 with additional details relating to resource reallocation based on expected rewards, arranged in accordance with at least some embodiments described herein. FIG. 4 is substantially similar to computer system 100 of FIGS. 1-3, with additional details. Those components in FIG. 4 that are labeled identically to components of FIGS. 1-3 will not be described again for the purposes of clarity.

In another example, formulation 303 may be based on a general-sum game, where attacker expected rewards and defender expected rewards may be represented as general functions. Formulation 303 may be difficult to solve when $f_i^d(x)$ and $f_i^a(x)$ are general concave/convex functions. Thus, it may be arbitrary whether the functions may be approximated as piecewise linear functions without suffering from a degradation in performance that may not be easily bounded. In some examples, an defender expected reward function $f_i^d(x)$ may be approximated, but an expected attack reward function $f_i^a(x)$ may not be easily approximated due to the nature of general concave/convex functions, and due to a possibly large difference between $f_i^d(x)$ and $f_i^a(x)$. A small variation in the attacker expected reward function $f_i^d(x)$ may lead to a change in action and thus lead to a potentially huge loss in the defender expected reward $f_i^d(x)$.

In an example shown in FIG. 4, there are two areas to be allocated with resources. X-axis of graphs 400, 410 may indicate the probability that a first area (Area 1) is protected. Y-axis of graphs 400, 410 may indicate an attacker expected reward resulting from an attack on an area. The expected attack reward functions for attacking Area 1 and Area 2 can be represented as functions of $d_1^t$.

As shown in graph 400, as a percentage of resources allocated to Area 1 increases, an attacker expected reward resulting from an attack on Area 1 (shown by line 401) may decrease. In other words, increasing allocation of resources to an area may fortify a defense of the area, and may reduce an attacker reward. Attacker expected reward may be approximated from a general function to a piecewise linear function, such as by processor 110, as shown by line 402.

Further, as shown in graph 401, as a percentage of resources allocated to Area 1 increases, an attacker expected reward resulting from an attack on Area 2 (shown by line 403) may increase as well. The attacker expected reward on Area 2 may increase with an increase in resources allocation to Area 1 in response to more resources are being allocated to Area 1 and thus, less resources are being allocated to Area 2.

As shown in graph 410, as a percentage of resources allocated to Area 1 increases, a defender expected reward resulting from an attack on Area 1 (shown by line 411) may increase, but a defender expected reward resulting from an attack on Area 1 (shown by line 412) may increase.

Using graphs 400, 410 as example, given the approximated reward function of the attacker, an optimal defense strategy may be to allocate 48% of resources to Area 1 (see dotted line), assuming attacker may select to attack Area 1 and give the defender a defense reward score of "5.5". However, when the attacker is faced with the actual reward function (line 401), the attacker may choose to attack Area 2 due to an attacker expected reward for an attack on Area 2 (intersection between dotted line and line 402) being larger than an attacker expected reward for an attack on Area 1 (intersection between dotted line and line 401)—when 48% of the resource are allocated to Area 1 (which may lead to a defender expected reward of "4"). Thus, an approximation to an attacker expected reward function may be optional.

A risk-averse formulation 304 based on an approximation of an attacker expected reward function, and provides a lower bound of optimal defender expected reward, may include constrains (4) to (10), and objective function (27) and constraints (28) to (36) as shown below:

$$\max_{u,d,a,q,v,h} \Sigma_t (R_m^t + v^t) \quad (27)$$

$$v^t - \bar{f}_i^d(d_i^t) \leq (1 - q_i^t) M \quad (28)$$

$$v^t \in \mathbb{R} \quad (29)$$

$$0 \leq a^t - \bar{f}_i^a(d_i^t) \leq (1 - h_i^t) M \quad (30)$$

$$a^t \in \mathbb{R} \quad (31)$$

$$\xi(1 - q_i^t) \leq a^t - \bar{f}_i^a(d_i^t) \leq \xi + (1 - q_i^t) M \quad (32)$$

$$\Sigma_i q_i^t \geq 1 \quad (33)$$

$$q_i^t \in \{0,1\} \quad (34)$$

$$\Sigma_i h_i^t = 1 \quad (35)$$

$$h_i^t \in \{0,1\} \quad (36)$$

Assuming an attacker expected reward function is approximated as a piece-wise linear function $\bar{f}_i^a$ by selecting a set of discretization points, and a vibration $\xi$ is represented as $\xi = \max_i \bar{f}_i^a - f_i^a$. As $\bar{f}_i^a$ is piecewise linear, the formulation can be converted to MILP by standard procedure. In this formulation, it is assumed that the attacker expected reward function may be any function between $\bar{f}_i^a - \xi$ and $\bar{f}_i^a$. As $f_i^a$ is convex, $\bar{f}_i^a - \xi \leq f_i^a \leq \bar{f}_i^a$. This formulation may determine an optimal defender strategy assuming the nature will choose a function that is the worst for the defender. So the solution provides a lower-bound for the actual optimal value. A new set of binary variables $h_i^t$ (constraints (30), (35), (36)) is introduced to indicate which area may provide the attacker maximal expected reward simply given the approximated function, and $q_i^t$ (a selector, indicated in constraints (28), (32) to (34)) may indicate which area may give the attacker maximal expected reward considering the vibration indicated by $\xi$. Constraint (32) may instruct allocation module 160 to set selector $q_i^t$ to 1 if area i may be the target area given the vibration $\xi$ i.e., if $f_i^a \geq \max \bar{f}_i^a - \xi$. Constraint (30) may represent a defender expected reward may be given by the worst case, i.e., the minimum defender expected reward among all targets that may be attacked given the vibration $\xi$.

Defense module 140 may be configured to determine both moving rewards 320 ($R_m^t$) and defender rewards ($v^t$). Defense module 140 may send moving rewards 320 ($R_m^t$) and defender rewards ($v^t$) to allocation module 160. Allocation module 160 may identify objective function (27) in formulation 301 among allocation instructions 114, and constraints necessary to determine reallocation data 164. To determine reallocation data 164, allocation module 160 may, for example, determine a set of solutions to the objective function indicated by constraint (27) based on constraints (4) to (10) and (28) to (36).

Formulation 304 may be typically used to address a bounded rationality in human behavior. By determining reallocation data based on this formulation, additional noise may be added to the approximated functions, where the noise level may be given by the maximum difference of the specific function and approximation. Thus, an improvement to use adaptive discretization is utilized. After determination of the solution given an initial discretization, all areas with $q_i^t$ may be checked, and further discretization for these areas around the current solution $d_i^t$ may be performed for refinement purposes. A validation for such an iterative discretization may provide a relatively higher impact on the selector variables and thus may influence the final result positively.

Further, system 100 may be implemented to minimize a reallocation time. In an example, a minimization of reallocation time may be a high priority for defense entity 102. For example, defense entity 102 may desire to reallocate resources 104 to reach a reallocation indicated by reallocation data 164 as soon as possible, and given the modulation constraint, budget constraint and risk tolerance constraint. In other words, a defender may wish to reallocate resources in a fast, economic and safe way. Instead of minimizing the reallocation time T, system 100 may set up a formulation to identify a feasible solution given a reallocation time T and, subsequently, use binary search to decide a value for the reallocation time T. In some examples, T may be an integer, and a number of iteration to identify a value of T may be relatively small. Given T, a feasible solution, that may be equivalent to the minimum cost, is less than or equal to the given budget. An objective function (37), constraints (5) to (10), and the following constraints (38) to (42), may be parts of a formulation to identify a feasible reallocation time:

$$\max_{u,d,a,q} \Sigma_t R_m^t \quad (37)$$

$$v^t \geq \underline{R} \quad (38)$$

$$v^t \leq f_i^d(d_i^t) + (1 - q_i^t) M \quad (39)$$

$$0 \leq a^t - f_i^a(d_i^t) \leq (1 - q_i^t) M \quad (40)$$

$$a^t \leq \overline{R} \quad (41)$$

$$q_i^t \in \{0,1\} \quad (42)$$

$\underline{R}$ may denote a minimum reward for the defender that should be ensured and $\overline{R}$ may denote a maximum reward for the attacker that can be tolerated. Compared to the other formulations, defender response rewards 330 ($R_d^t$) may no longer part of the objective function indicate in constraint (37). In an example, allocation module 160 may determine that an optimal objective value is within the given budget and, in response, may select a smaller value for T at a next iteration. Otherwise, allocation module 160 may select a larger value for T for a next iteration.

Defense module 140 may be configured to determine moving rewards 320 ($R_m^t$) and may send moving rewards 320 ($R_m^t$) to allocation module 160. Allocation module 160 may identify objective function (37) in the above time reallocation formulation among allocation instructions 114, and constraints necessary to determine a feasible reallocation time. To determine the feasible reallocation time, allocation module 160 may, for example, determine a set of solutions to the objective function indicated by constraint (37) based on constraints (5) to (10) and (38) to (42).

In examples where the expected reward functions are piecewise linear, system 100 may convert the expected reward functions of the reallocation time formulation 304 to MILP. In examples based on a zero-sum game, the reallocation time formulation may include constraints (5) to (10) and, objective function (43), and constraints (44), (45), as shown below:

$$\max_{u,d,a} \Sigma_t R_m^t \quad (43)$$

$$a^t \geq f_i^d(d_i^t) \quad (44)$$

$$a^t \leq \overline{R} \quad (45)$$

Defense module 140 may be configured to determine both moving rewards 320 ($R_m^t$) and may send moving rewards 320 ($R_m^t$) to allocation module 160. Allocation module 160 may identify objective function (43) in the above time reallocation formulation, based on piecewise linear expected reward functions, among allocation instructions 114, and constraints necessary to determine a feasible reallocation time. To determine the feasible reallocation time, allocation module 160 may, for example, determine a set of solutions to the objective function indicated by constraint (43) based on constraints (5) to (10) and (44), (45).

In some examples, instead of solving multiple programs to minimize the time period, the objective of minimum time period may be incorporated into the following objective function, constraints (5) to (10), and the following constraints:

$$\max_{u,d,a,q,T} \Sigma_t R_m^t - KT$$

$$R_d^t = \Sigma_i f_i^d(d_i^t) q_i^t \geq R$$

$$0 \leq a^t - f_i^a(d_i^t) \leq (1-q_i^t)M$$

$$a^t \leq \overline{R}$$

$$q_i^t \in \{0,1\}$$

In an example, assume the maximum of $R_m^t$ is $R_m^+$, and the maximum time period is $T^+$, and where K is a positive number that is larger than $R_m^+ T^+$. If two solutions are identified, such as $T_1$ and $T_2$, where $T_1 > T_2 + 1$, then the objective function value with $T_2$ may be larger than the objective function value with $T_1$. Further, $0 < R_m^t < R_m^*$ and $0 < \Sigma_t R_m^t < K$, such that $\Sigma_t R_m^{t(1)} - KT_1 < K - KT_1 < 0 - KT_2 < \Sigma_t R_m^{t(2)} - KT_2$. This formulation may be converted into a MILP with binary variables indicating the end of the reallocation process. However, an order $O(T^+N)$ binary variables is needed, thus resulting in inefficient solution to this formulation. The converted formulation may include constraints (5) to (10) and the following objective function and constraints:

$$\max_{u,d,a,q} \Sigma_t (R_m^t - K) s^t$$

$$s^t = 0 \text{ if } \Sigma b_t^i = 0$$

$$b_t^i = 0 \text{ if } d_i^t = \beta^i$$

$$R_d^t = \Sigma_i f_i^d(d_i^t) q_i^t \geq \underline{R}$$

$$0 \leq a^t - f_i^a(d_i^t) \leq (1-q_i^t)M$$

$$a^t \leq \overline{R}$$

$$q_i^t \in \{0,1\}$$

In some examples, a mixed defender strategy with non-linear expected reward functions may be determined from an implementation of system 100. Previous work in Stackelberg security games usually assumes the attacker gets a reward $U_a^u$ when the target being attacked is uncovered and a penalty $U_a^c$ if the target being attacked is covered. Thus, the expected reward for the attacker is a linear function in the coverage probability x, i.e., $U_a = x U_a^c + (1-x) U_a^u$. When this expected reward is generalized to any monotonic function, system 100 may be implemented to determine an optimal allocation.

In some examples, system 100 may be implemented to apply models on an area-based graph game with unit distance. Assume a graph of several hotspots, and distances between each pair of hotspots is the same if there is an edge linking the pair. A single patroller may patrol the graph to protect the hotspots. A strategy of the patroller may be represented as a Markov Decision Process (MDP) and the attacker may fully explore the randomized strategy of the patroller. The attacker may attack one of the hotspots at discretized time points. If the expected reward for the attacker is a general function of the probability that the patroller shows up in the hotspot, system 100 may be implemented to determine an optimal patrol strategy.

Figure 5:
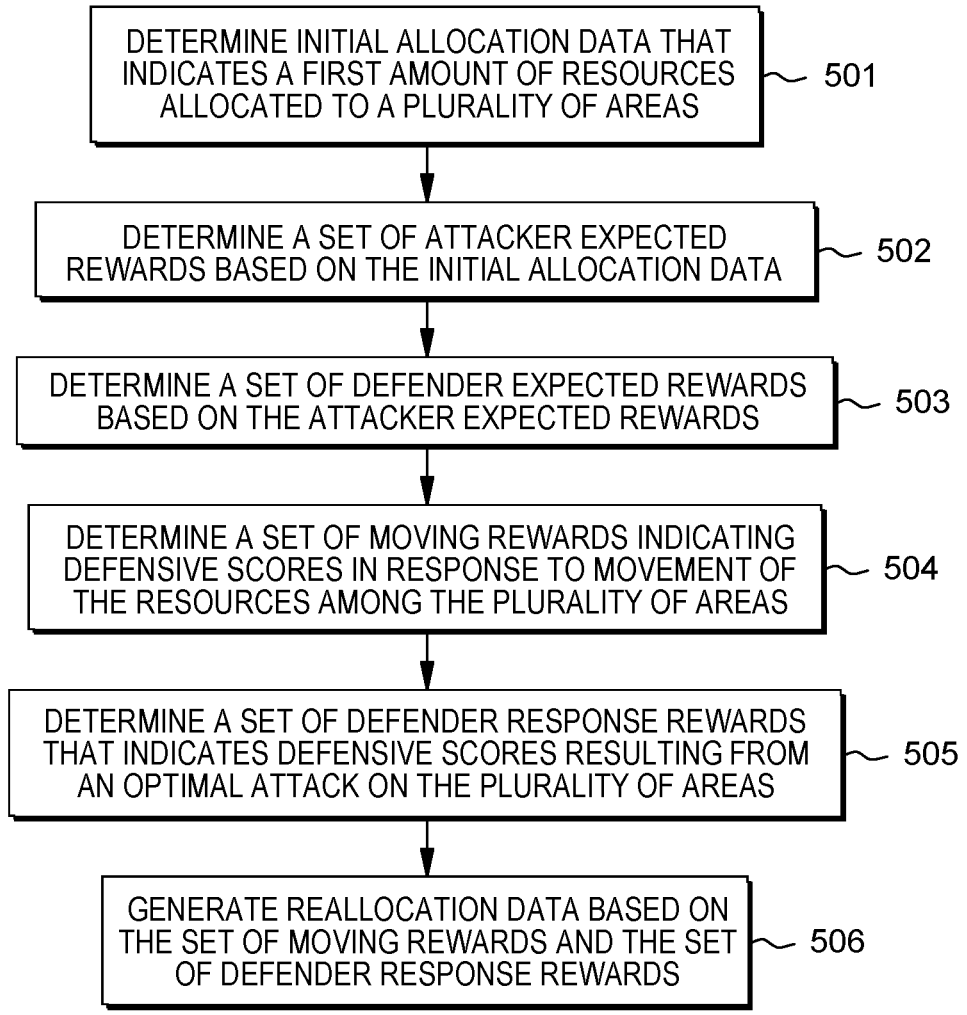
FIG. 5 illustrates a flow diagram for an example process to implement resource reallocation based on expected rewards.

FIG. 5 illustrates a flow diagram for an example process to implement resource reallocation based on expected rewards, arranged in accordance with at least some embodiments presented herein. The process in FIG. 5 could be implemented using, for example, computer system 100 discussed above. An example process may include one or more operations, actions, or functions as illustrated by one or more of blocks 501, 502, 503, 504, 505, and/or 506. Although illustrated as discrete blocks, various blocks may be divided into additional blocks, combined into fewer blocks, eliminated, or performed in parallel, depending on the desired implementation.

Processing may begin at block 501, where an allocation module of a computer device may determine initial allocation data that indicates a first amount of resources allocated to a plurality of areas.

Processing may continue from block 501 to block 502. At block 502, an attack module of the computer device may determine a set of attacker expected rewards based on the initial allocation data. Each attacker expected reward may indicate an expectation of attack scores resulting from an attack on a corresponding area, and each attacker expected reward may decrease as an amount of resources allocated to the corresponding area increases;

Processing may continue from block 502 to 503. At block 503, a defense module of the computer device may determine a set of defender expected rewards based on the attacker expected rewards. Each defender expected reward may indicate an expectation of defensive scores resulting from the attack on the corresponding area, and each defender expected reward may increase as an amount of resources allocated to the corresponding area increases;

Processing may continue from block 503 to 504. At block 504, the defense module of the computer device may determine a set of moving rewards indicating defensive scores in response to movement of the resources among the plurality of areas.

Processing may continue from block 504 to 505. At block 505, the defense module of the computer device may determine a set of defender response rewards that indicates defensive scores resulting from an optimal attack on the plurality of areas.

Processing may continue from block 505 to 506. At block 506, the allocation module of the computer device may generate reallocation data based on the set of moving rewards and the set of defender response rewards. The reallocation data may indicate an allocation of a second amount of resources to the plurality of areas, and the second amount of resources may maximize at least some of the defensive scores indicated by the set of moving rewards and the set of defender response rewards.

Figure 6:
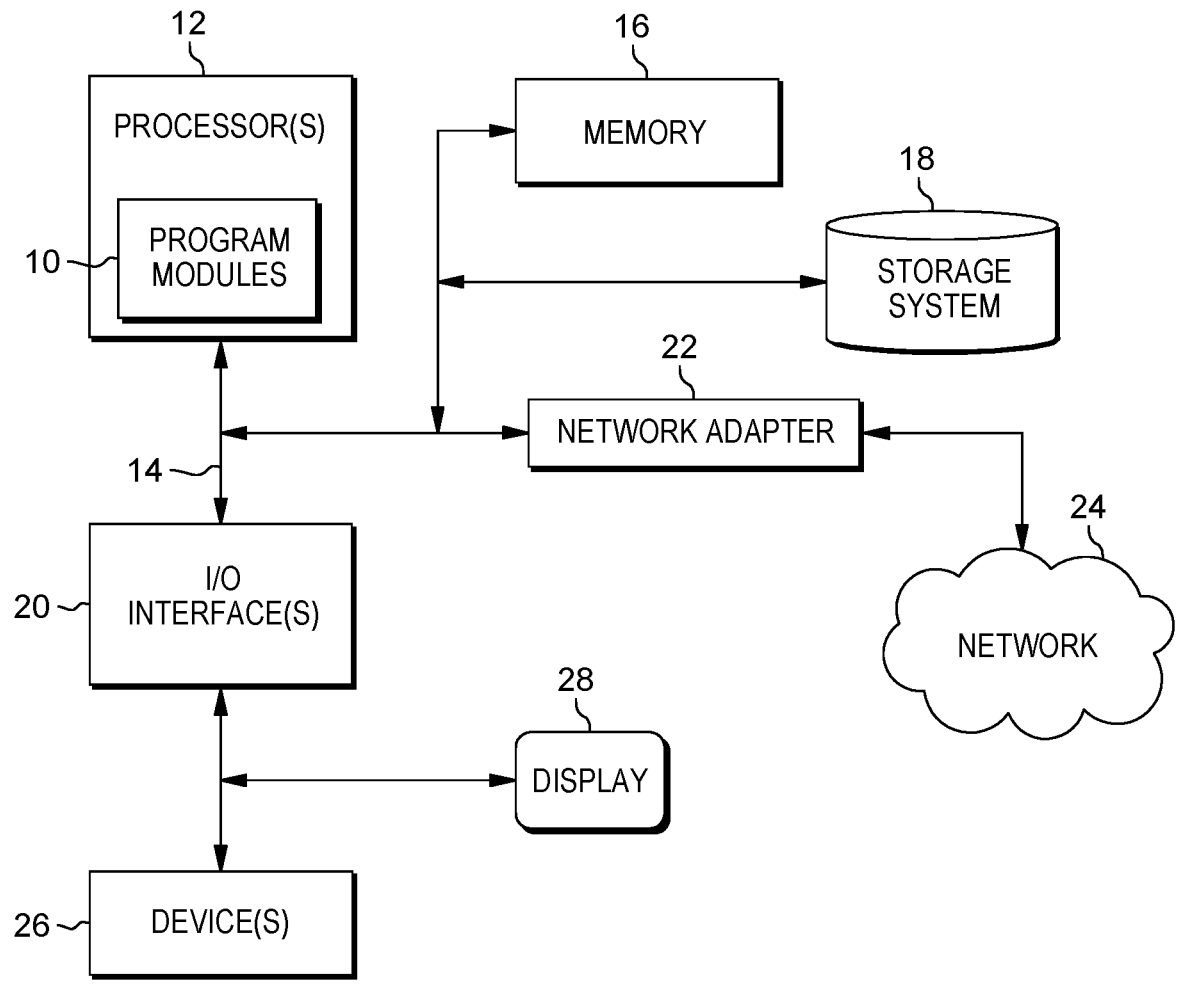
FIG. 6 is an exemplary block diagram of a computer system in which processes involved in the system, method, and computer program product described herein may be implemented.

FIG. 6 illustrates a schematic of an example computer or processing system that may implement any portion of computer system 100, processor 110, memory 112, cost module 130, defense module 140, attack module 150, allocation module 160, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computer system environments or configurations. Examples of well-known computer systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining a reallocation of resources among a plurality of physical areas, the method comprising:
   determining, by a computer device associated with a defender entity, initial allocation data that indicates a first amount of resources allocated to a plurality of physical areas;
   determining, by the computer device, a set of attacker expected rewards based on the initial allocation data, wherein each attacker expected reward indicates an expectation of attack scores resulting from an attack on a corresponding physical area, and each attacker expected reward decreases as an amount of resources allocated to the corresponding physical area increases;

determining, by the computer device, a set of defender expected rewards based on the attacker expected rewards, wherein each defender expected reward indicates an expectation of defensive scores resulting from the attack on the corresponding physical area, and each defender expected reward increases as an amount of resources allocated to the corresponding physical area increases;

determining, by the computer device, a set of moving rewards indicating defensive scores in response to movement of the resources among the plurality of physical areas;

determining, by the computer device, a set of defender response rewards that indicates defensive scores resulting from an optimal attack on the plurality of physical areas, wherein the optimal attack is based on a simulation, by the computer device associated with the defender entity, of an optimal response by an attack entity in response to the first amount of resources allocated to a plurality of physical areas; and generating, by the computer device, reallocation data based on the set of moving rewards and the set of defender response rewards, wherein the reallocation data indicates an allocation of a second amount of resources to the plurality of physical areas, and the second amount of resources maximizes at least some of the defensive scores indicated by the set of moving rewards and the set of defender response rewards.

2. The method of claim 1, wherein the attacker expected rewards and the defender expected rewards are represented by piecewise linear and monotonic functions.

3. The method of claim 1, wherein determination of the set of moving rewards is based on a set of transition costs to move the resources among the plurality of physical areas.

4. The method of claim 1, wherein determination of the set of defender expected rewards includes determining a set of solutions that minimizes a function representing the set of attacker expected rewards.

5. The method of claim 1, wherein generating the reallocation data includes determining a set of solutions to an objective function to maximize the set of moving rewards and the set of defender response rewards, wherein the set of solutions include the second amount of resources to be allocated to the plurality of physical areas.

6. The method of claim 5, wherein determination of the set of solutions to the objective function is based on a set of constraints including a total number of time epochs and a limit on an amount of resources that may be moved at each time epoch.

7. The method of claim 1, further comprising determining, a feasible reallocation time to reallocate the second amount of resources to the plurality of physical areas within a time period.

8. The method of claim 7, wherein determining the feasible reallocation time includes determining a set of solutions to an objective function to maximize the set of moving rewards based on a set of constraints associated with a minimum reward for the defender that should be ensured, a maximum reward for the attacker that can be tolerated.

9. A system effective to determine a reallocation of resources among a plurality of physical areas, the system comprising:

a memory configured to store a set of allocation instructions;

a computer device configured to be in communication with the memory, the computer device is associated with a defender entity, and the computer device includes:

an allocation module;

an attack module configured to be in communication with the allocation module;

a defense module configured to be in communication with the allocation module and the attack module;

the allocation module is configured to:
  determine initial allocation data that indicates a first amount of resources allocated to a plurality of physical areas;
  send the initial allocation data to the attack module;

the attack module is configured to determine a set of attacker expected rewards based on the initial allocation data, where each attacker expected reward indicates an expectation of attack scores resulting from an attack on a corresponding physical area, and each attacker expected reward decreases as an amount of resources allocated to the corresponding physical area increases;

the defense module is configured to:

determine a set of defender expected rewards based on the attacker expected rewards, wherein each defender expected reward indicates an expectation of defensive scores resulting from the attack on the corresponding physical area, and each defender expected reward increases as an amount of resources allocated to the corresponding physical area increases;

determine a set of moving rewards indicating defensive scores in response to movement of the resources among the plurality of physical areas;

determine a set of defender response rewards that indicates defensive scores resulting from an optimal attack on the plurality of areas, wherein the optimal attack is based on a simulation of an optimal response by an attack entity in response to the first amount of resources allocated to a plurality of physical areas;

send the set of moving rewards to the allocation module;

send the set of defender response rewards to the allocation module; and the allocation module is further configured to generate reallocation data based on the set of moving rewards and the set of defender response rewards, wherein the reallocation data indicates an allocation of a second amount of resources to the plurality of physical areas, and the second amount of resources maximizes at least some of the defensive scores indicated by the set of moving rewards and the set of defender response rewards.

10. The system of claim 9, wherein the attacker expected rewards and the defender expected rewards are represented by piecewise linear and monotonic functions.

11. The system of claim 9, wherein determination of the set of moving rewards is based on a set of transition costs to move the resources among the plurality of physical areas.

12. The system of claim 9, wherein generation of the reallocation data includes a determination of a set of solutions to an objective function to maximize the set of moving rewards and the set of defender response rewards, wherein the set of solutions include the second amount of resources to be allocated to the plurality of physical areas.

13. The system of claim 12, wherein determination of the set of solutions to the objective function is based on a set of constraints including a total number of time epochs and a limit on an amount of resources that may be moved at each time epoch.

14. The system of claim 9, wherein the allocation module is further configured to determine a feasible reallocation time to reallocate the second amount of resources to the plurality of physical areas within a time period.

15. A computer program product for determining a reallocation of resources among a plurality of physical areas, the computer program product comprising a computer readable storage medium having program instructions embodied therewith, the program instructions executable by a device to cause the device to:
- determine initial allocation data that indicates a first amount of resources allocated to a plurality of physical areas;
- determine a set of attacker expected rewards based on the initial allocation data, where each attacker expected reward indicates an expectation of attack scores resulting from an attack on a corresponding physical area, and each attacker expected reward decreases as an amount of resources allocated to the corresponding physical area increases;
- determine a set of defender expected rewards based on the attacker expected rewards, wherein each defender expected reward indicates an expectation of defensive scores resulting from the attack on the corresponding physical area, and each defender expected reward increases as an amount of resources allocated to the corresponding physical area increases;
- determine a set of moving rewards indicating defensive scores in response to movement of the resources among the plurality of physical areas;
- determine a set of defender response rewards that indicates defensive scores resulting from an optimal attack on the plurality of physical areas, wherein the optimal attack is based on a simulation of an optimal response by an attack entity in response to the first amount of resources allocated to a plurality of physical areas, wherein the simulation is performed by a defender entity; and
- generate reallocation data based on the set of moving rewards and the set of defender response rewards, wherein the reallocation data indicates an allocation of a second amount of resources to the plurality of physical areas, and the second amount of resources maximizes at least some of the defensive scores indicated by the set of moving rewards and the set of defender response rewards.

16. The computer program product of claim 15, wherein the attacker expected rewards and the defender expected rewards are represented by piecewise linear and monotonic functions.

17. The computer program product of claim 15, wherein determination of the set of moving rewards is based on a set of transition costs to move the resources among the plurality of physical areas.

18. The computer program product of claim 15, wherein generation of the reallocation data includes a determination of a set of solutions to an objective function to maximize the set of moving rewards and the set of defender response rewards, wherein the set of solutions include the second amount of resources to be allocated to the plurality of physical areas.

19. The computer program product of claim 18, wherein determination of the set of solutions to the objective function is based on a set of constraints including a total number of time epochs and a limit on an amount of resources that may be moved at each time epoch.

20. The computer program product of claim 15, wherein the program instructions are further executable by the device to cause the device to determine a feasible reallocation time to reallocate the second amount of resources to the plurality of physical areas within a time period.

* * * * *